Feb. 19, 1946. J. MORKOSKI 2,395,342
TRIPPING MECHANISM
Filed May 15, 1944
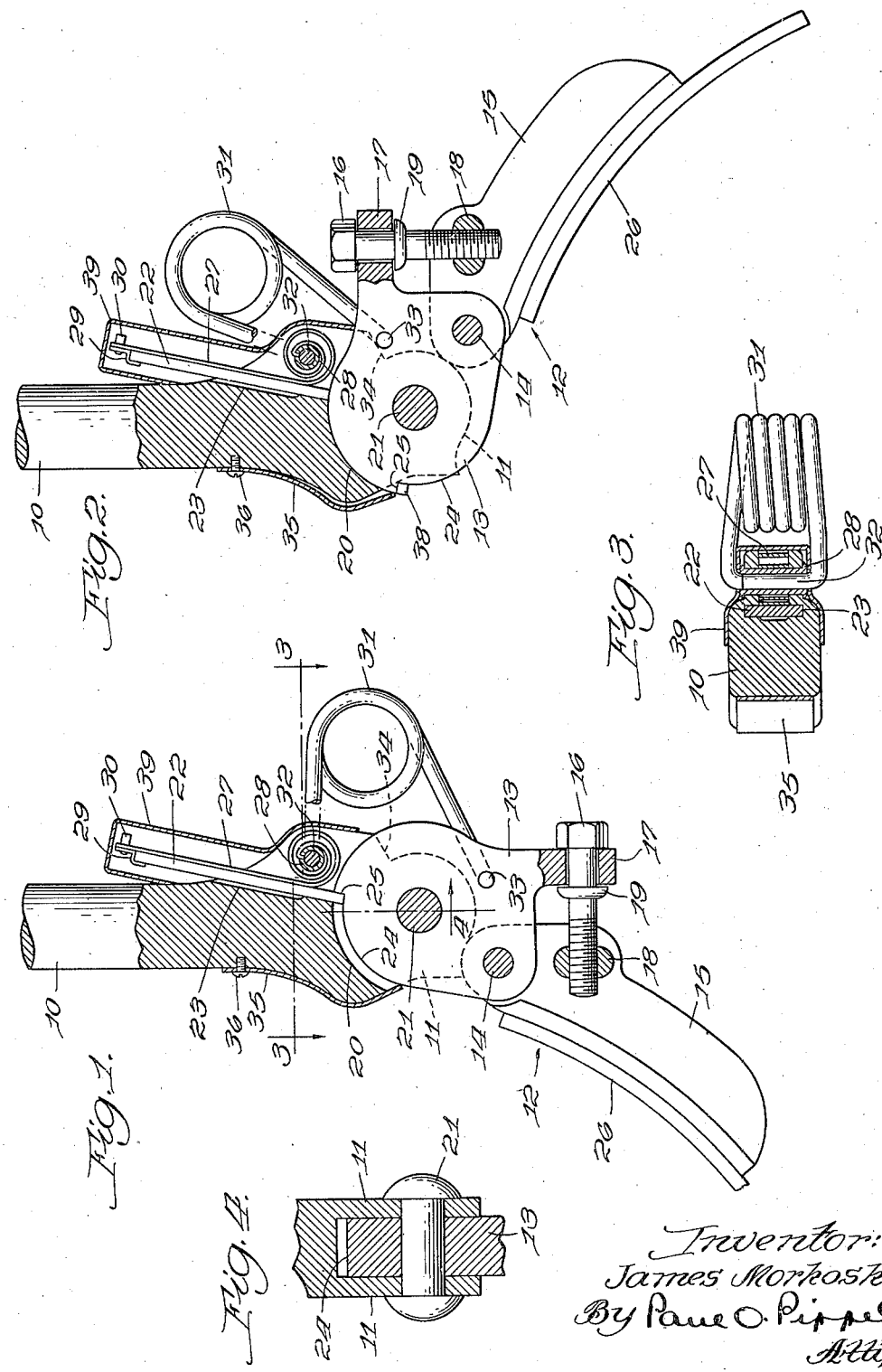
Inventor:
James Morkoski.
By Paul O. Pippel
Atty.

Patented Feb. 19, 1946

2,395,342

UNITED STATES PATENT OFFICE 2,395,342

TRIPPING MECHANISM

James Morkoski, Canton, Ill., assignor to International Harvester Company, a corporation of New Jersey Application May 15, 1944, Serial No. 535,651

7 Claims. (Cl. 97—184)

This invention relates to agricultural implements and more particularly to a tripping mechanism for earth-working tools such as cultivators.

Cultivator shovels are customarily mounted on shanks which are pivoted to a supporting standard or the like, the parts being normally so connected as to prevent the shovel or cutting blade from yielding under the ordinary stresses incurred in soil penetration, but to permit yielding when such an obstruction is encountered as would damage the cutting blade or its associated parts. Spring trips to permit a cultivator shovel or the like to yield upon encountering an abnormal obstruction are well known. Such spring trips usually take the form of a toggle connecting the standard and the tool-carrying shank and a spring tending to straighten the toggle to hold the tool in operating position. However, a serious disadvantage inherent in such devices is that when the joints of the toggle are subjected to rust and wear, they act differently and the tools trip too easily or too difficultly.

It is also known to provide pins which hold the working tool in operating position but which break when a predetermined stress is encountered. The principal objection to this type of tripping mechanism has been that frequent replacement of the broken pin was required, and the device was generally unsatisfactory.

The principal object of the present invention is to provide a simple and efficient tripping mechanism for the earth-working tool of an agricultural implement, such as a cultivator or the like.

Another object is to provide a novel mounting for an earth-working tool.

A further object is to provide a novel tripping mechanism for an earth-working tool wherein a shear strip is utilized to prevent yielding of the tool and movement thereof to inoperative position under normal operating conditions, but shearable under predetermined overload to permit the tool to yield.

Still another object is to provide a magazine-fed shear strip for a cultivator shovel by which, when a portion of the strip has been sheared, the unsheared part of the strip is automatically placed in position for another shearing operation.

Other objects and advantages of the invention will become clear from the following detailed description when read in conjunction with the accompanying drawing, wherein:

Figure 1 is a view in side elevation, partly in section, of an implement embodying the features of the present invention and showing the cultivator shovel in operating position;

Figure 2 is a view similar to Figure 1 but showing the shovel retracted to inoperative position;

Figure 3 is a view taken on the line 3—3 of Figure 1; and

Figure 4 is a detail on the line 4 of Figure 1.

In the drawing, the numeral 10 designates a standard adapted to be attached in a manner well-known in the art to an implement frame. However, for convenience, only that portion of the implement illustrative of the present invention is shown in the drawing. Standard 10 is broadened at its base and bifurcated at its lower end to provide laterally spaced ears 11 having openings therein for the pivotal mounting of a tool-carrying shank generally indicated at 12. Shank 12 comprises a body portion 13 having pivoted thereto, by a pin 14, a tool-carrying member 15. Portions 13 and 15 are held adjustably against relative pivotal movement by a bolt 16 extending through a boss 17 depending from portion 13 of the shank and having a threaded end received in a correspondingly threaded swivel 18 pivoted on the tool-carrying portion 15. Bolt 16 is held against axial movement in boss 17 by a collar 19.

The lower portion of standard 10 between ears 11 is arcuately shaped to form a socket 20. Body portion 13 of shank 12 is pivoted upon a pin 21 between the ears 11 and has its upper surface complementarily shaped to mate with the socket portion 20 of standard 10 to form a joint therewith. Thus shank 12 has pivotal movement with respect to standard 10, and the upper surface thereof is in sliding engagement with the socket portion 20.

The mechanism by which shank 12 is held against movement to inoperative position includes a shear strip 22, preferably consisting of an elongated strip of metal of rectangular cross-section, as clearly shown in Figure 3, and capable of withstanding a predetermined shear stress. Strip 22 is slidably received in an opening 23 in the standard 10 extending in a generally axial direction therethrough and opening into the socket 20. It will be noted particularly well in Figure 1 that the upper surface of body portion 13 of shank 12 has an offset portion forming with the socket 20 a groove or recess 24 extending at least the width of the strip 22 and occupying a considerable portion of the arcuate upper portion of the shank. Thus, the recess or groove 24 extends to the outside of the implement to provide a marginal opening between the lower portion of standard 10 and the shank 12. The shoulder 25 formed by the offset portion of body 13 is in alinement with the opening 23 when the tool is in operating position, as indicated in Figure 1. In this position, therefore, the strip 22 extends into recess 24 and abuts against the shoulder 25 so that, upon a predetermined overload on the shank 12 as a result of the contact by cutting blade 26 with an abnormal obstruction, the portion of strip 22 extending into recess 24 will be sheared off by the shoulder 25.

Shear strip 22 is urged in the direction of the recess 24 by a coil spring 27 fastened at one end to a bushing 28 seated in the lower portion of standard 10 and provided at its other end with a clip 29 fastened thereto by a bolt 30. Clip 29 is adapted to fit over the top of strip 22, and the tension upon the spring 27 thus urges it into the recess or offset 24, so that each time a section is sheared from the strip 22, and shank 12 is returned to its operating position, a successive portion of the strip is automatically forced into position against the shoulder 25 in readiness for another stripping operation.

Shank 12 after pivoting rearwardly to the position shown in Figure 2 is urged back to operative position by a spring 31 having a transversely bent upper end 32 pivotally received in the bushing 28 in standard 10 and its lower end bent to form a transverse portion 33 pivoted in the body portion 13 of shank 12. Transverse portion 33 extends a sufficient distance laterally from the body portion 13 to contact an offset portion 34 of standard 10 to serve as a stop and limit the rearward pivoting of the shank.

The marginal opening to recess 24 is closed by a leaf spring 35 fastened at its upper end to standard 10 by a screw 36. The lower end of spring 35, closing the opening to recess 24, is deflected outwardly by the sheared portion 38 of the strip 22 and the shoulder 25 of the shank. The sheared portion 38 is frequently held in place against the shoulder 25 by friction and does not become unseated when the tool-carrying shank is pivoted. However, upon return of the shank to operating position, the sheared portion 38 is engaged by the spring 35 and is unseated thereby. The spring 35 thus serves the double function of protecting the recess 24 against the entrance of foreign material and ejecting the sheared portions of the strip 22.

As pointed out before, the tool-carrying portion 15 of shank 12 is adjustable with respect to the body portion 13 by means of the bolt 16 in order to vary the pitch of the cutting blade 26 and the angle at which it penetrates the soil.

It should now be clear that a simple and efficient magazine type of feed for the trip mechanism of an agricultural implement has been provided. If desired, in order to protect the mechanism against the entrance of dirt and other foreign matter, a guard 39 may be provided.

While the invention has been described in its application to a cultivator shovel supported upon a standard, it should be understood that the invention is likewise applicable to other earthworking tools. Therefore, it is desired that the invention be limited only by the scope of the appended claims.

What is claimed is:

1. In an agricultural implement, a standard having a socket, a tool-carrying shank having a mating portion forming a joint with said socket, means pivoting said shank to said standard for movement to and from operating position, resilient means urging said shank to working position, the mating portion of said shank having an offset portion and a shoulder and defining with said socket a recess opening to the outside, and means for preventing movement of said shank to inoperative position comprising a magazine-fed shear strip extending into said recess and engaging said shoulder.

2. In an agricultural implement, a standard having a socket, a tool-carrying shank having a mating portion forming a joint with said socket, means pivoting said shank to said standard for movement to and from operating position, resilient means urging said shank to working position, the mating portion of said shank having an offset portion and a shoulder and defining with said socket a recess opening to the outside, means for preventing movement of said shank to inoperative position comprising a magazine-fed shear strip extending into said recess and engaging said shoulder, resilient means biasing said shear strip into said recess, and yieldable means closing the opening to said recess.

3. In an agricultural implement, the combination of a supporting standard having an arcuate socket, a complementary tool-carrying shank having an offset portion spaced from the wall of said socket and a shoulder portion adjacent thereto, said offset portion forming a marginal opening in said shank, means pivoting said shank on said standard for movement to inoperative position in response to overload thereon, means for preventing movement of said tool-carrying shank to inoperative position including an opening in said standard in alinement with said shoulder when the tool-carrying shank is in operating position, a shear member slidable in said opening and operatively engaging said shoulder, said member being adapted to shear under a predetermined load on said tool-carrying shank, and a resilient member carried by said standard for urging said strip into operative engagement with said shoulder.

4. In an agricultural implement, the combination of a supporting standard having an arcuate socket, a complementary tool-carrying shank forming a joint with said socket and having an offset portion with an abutment at its inner end, means pivoting said shank to said standard for movement to inoperative position, a shear strip carried by said standard extending into said groove and operatively engaging said abutment to prevent movement of said shank to inoperative position, means carried by said standard for urging successive portions of said strip into said groove, said groove forming a marginal opening between said standard and said shank for the discharge of the sheared portion of said strip when the shank has pivoted to inoperative position, and a yieldable member covering said opening and serving to eject the sheared portion of said shear strip.

5. In an agricultural implement, the combination of a supporting standard having an arcuate socket, a complementary tool-carrying shank forming a joint with said socket and having an offset portion with an abutment at its inner end, means pivoting said shank to said standard for movement to inoperative position, a shear strip carried by said standard extending into said groove and operatively engaging said abutment to prevent movement of said shank to inoperative position, means carried by said standard for urging successive portions of said strip into said groove, said groove forming a marginal opening between said standard and said shank for the discharge of the sheared portion of said strip when the shank has pivoted to inoperative position, and a leaf spring secured at one end to said standard, the free end of said spring covering said opening and serving to eject the sheared portion of said shear strip.

6. In an agricultural implement, the combination of a supporting standard having an arcuate socket, a complementary tool-carrying shank forming a joint with said socket and having an offset portion with an abutment at its inner end, means pivoting said shank to said standard for movement to inoperative position, a shear strip carried by said standard extending into said groove and operatively engaging said abutment to prevent movement of said shank to inoperative position, means carried by said standard for urging successive portions of said strip into said groove, said groove forming a marginal opening between said standard and said shank for the discharge of the sheared portion of said strip when the shank has pivoted to inoperative position, a yieldable member covering said opening and serving to eject the sheared portion of said shear strip, and spring means connecting said standard and said shank arranged to bias said tool-carrying shank to operative position.

7. In an agricultural implement, the combination of a supporting standard having laterally spaced ears at its lower end and an arcuate socket therebetween, a tool-carrying shank pivoted between said ears for movement to and from working position and having a mating portion at its upper end adapted to form a joint with said socket, means pivoting said shank to said standard, means holding said shank in operative position, said shank comprising a body portion and a blade-carrying portion pivoted to said body portion, adjustable means for holding said blade-carrying portion against movement with respect to said body portion, means pivoting said shank to said standard, means holding said shank in operating position including a shearable strip slidingly carried by said standard and extending into said arcuate socket, said mating portion and said socket defining a recess arranged to receive the end of said strip, and means carried by said standard for urging said strip into said recess.

JAMES MORKOSKI.